(12) United States Patent
Cheng

(10) Patent No.: US 7,093,390 B2
(45) Date of Patent: Aug. 22, 2006

(54) FLORAL BOUQUET WRAPPER

(76) Inventor: Kui Eng Cheng, Flat B, 8/F., Block B, Cornwall Court, 54 King's Road, North Point (HK)

( * ) Notice: Subject to any disclaimer, the term of this patent is extended or adjusted under 35 U.S.C. 154(b) by 0 days.

(21) Appl. No.: 10/972,540

(22) Filed: Oct. 25, 2004

(65) Prior Publication Data

US 2006/0096173 A1    May 11, 2006

(51) Int. Cl.
*A01G 5/00* (2006.01)
*A01G 9/02* (2006.01)

(52) U.S. Cl. .......................... 47/41.01; 47/72
(58) Field of Classification Search ................ 2/1, 2/162, 244; 47/41.01, 55, 41.13, 72; 428/7, 428/15, 17, 23, 542.2; D11/43, 117, 200, D11/210; D24/6
See application file for complete search history.

(56) References Cited

U.S. PATENT DOCUMENTS

| | | | | |
|---|---|---|---|---|
| D13,297 S * | 9/1882 | Allen | ......... | D11/148 |
| 848,386 A * | 3/1907 | McGahan | ......... | 428/17 |
| 1,044,260 A * | 11/1912 | Schloss | ......... | 47/41.01 |
| 1,816,714 A * | 7/1931 | Adler | ......... | 24/6 |
| D138,921 S * | 9/1944 | Ordens | ......... | D11/146 |
| 2,553,953 A * | 5/1951 | Arkinstall | ......... | 428/17 |
| 2,563,202 A * | 8/1951 | Wurzlow | ......... | 47/41.01 |
| 2,771,695 A * | 11/1956 | James | ......... | 428/23 |
| 3,044,200 A * | 7/1962 | Teufel | ......... | 428/27 |
| 3,243,336 A * | 3/1966 | Auge | ......... | 428/23 |
| 3,616,105 A * | 10/1971 | Marks | ......... | 428/18 |
| 5,443,670 A * | 8/1995 | Landau | ......... | 156/191 |
| D409,522 S * | 5/1999 | Satterfield et al. | ......... | D11/200 |
| D419,436 S * | 1/2000 | Celtorius et al. | ......... | D9/663 |
| 6,417,119 B1 * | 7/2002 | Roberson | ......... | 442/149 |
| 6,701,531 B1 * | 3/2004 | Hayden | ......... | 2/162 |

* cited by examiner

Primary Examiner—Francis T. Palo
(74) Attorney, Agent, or Firm—Kirschstein, et al.

(57) ABSTRACT

A bouquet of flowers is wrapped with a leaf-shaped sheet that creates a floral presentation having a common floral theme.

20 Claims, 2 Drawing Sheets

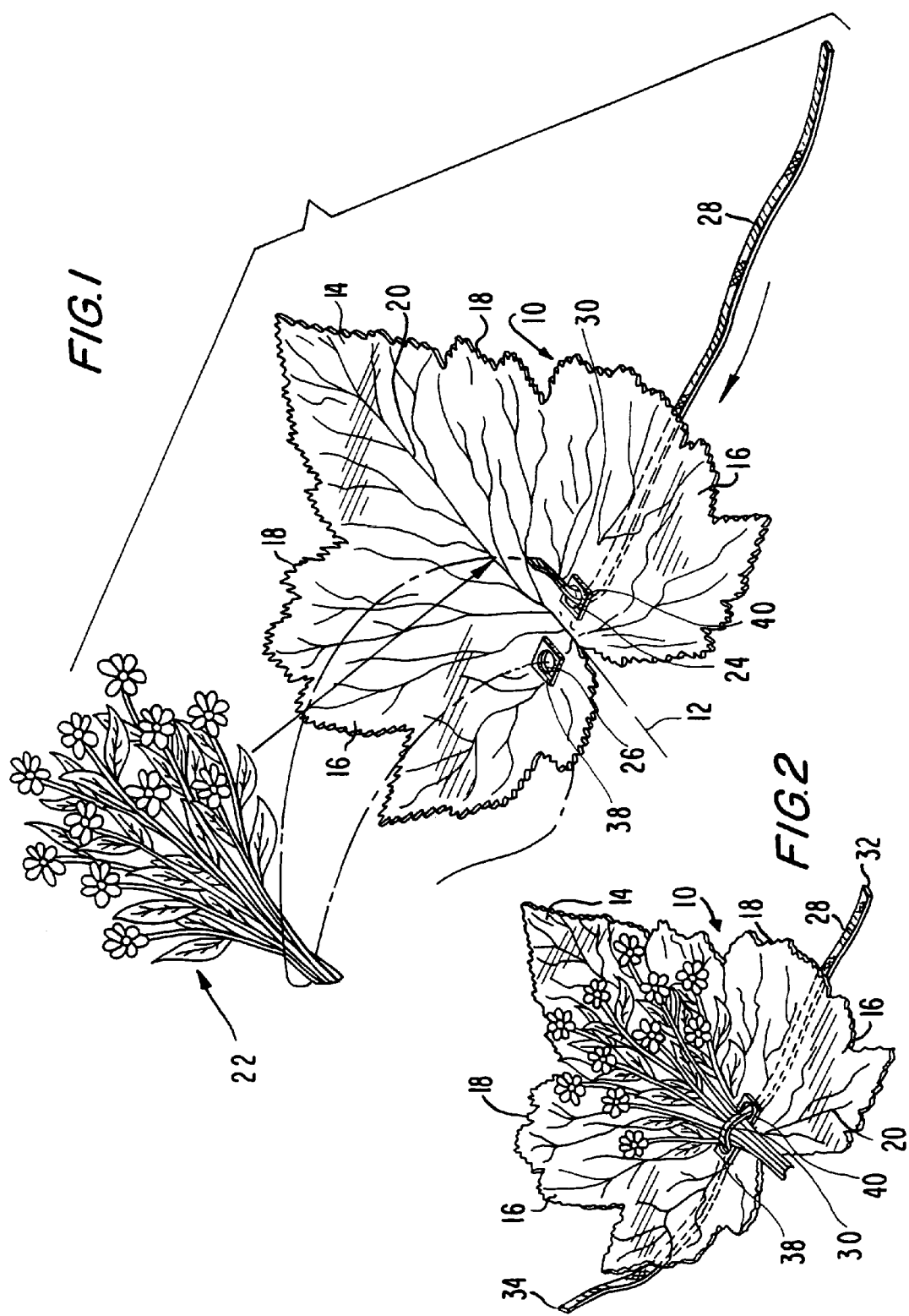

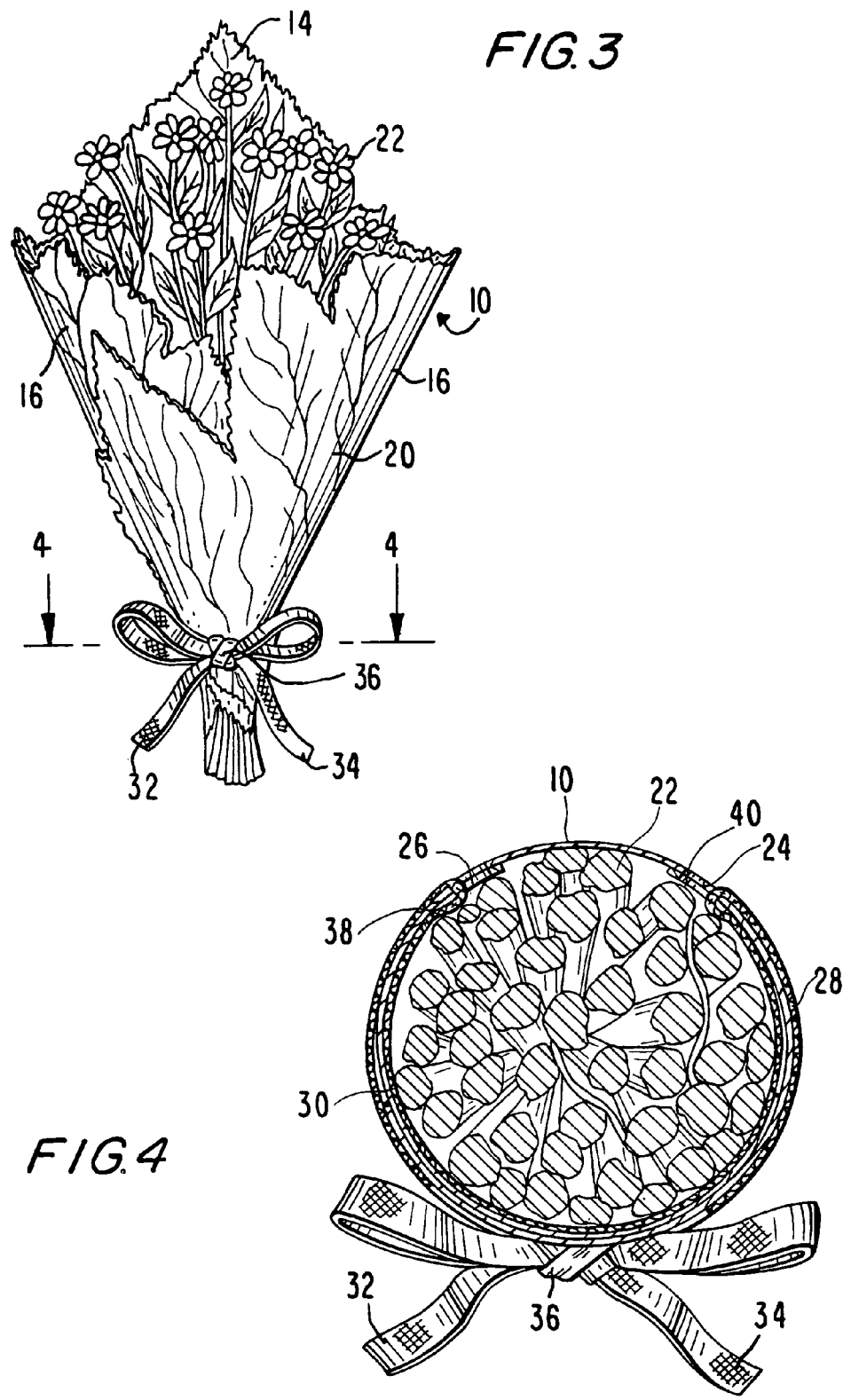

FLORAL BOUQUET WRAPPER

BACKGROUND OF THE INVENTION

1. Field of the Invention

The present invention generally relates to an ornamental wrapper for a bouquet of cut flowers.

2. Description of the Related Art

Rectangular boxes, with and without windows, are used by florists to package and ship slender floral presentations, but are unsuitable for fan-shaped floral bouquets. Florists disfavor stacking bulky floral boxes, as well as assembling such boxes from flat, die-cut stock.

To provide an effective fan-shaped bouquet, florists will sometimes arrange the cut flowers in a vase, and surround the upper portions of the flowers extending upwardly from the vase with a temporary, transparent, protective sheet of film. However, vases are more expensive than boxes, are more fragile, and require more room to maintain an adequate inventory.

Although not as effective as boxes and vases are in protecting the flowers, the most economical way of packaging and wrapping a fan-shaped floral bouquet is to curl or roll a rectangular sheet of paper and/or a sheet of plastic film into the general form of a cone, and to hold the conical form together by staples, tape, or other conventional fasteners. Each rectangular sheet is typically cut from a cylindrical roll of sheet material. The sheet material is typically a plain white sheet, or may be printed with decorations. Even so, the floral presentation suffers, because the wrapper is not an integrally related design element of the entire floral presentation.

SUMMARY OF THE INVENTION

OBJECTS OF THE INVENTION

Accordingly, it is a general object of this invention to integrally relate the wrapper to the cut flowers to create a floral presentation having a common floral theme.

More particularly, it is an object of the present invention to provide a floral package or wrapper that can be stocked flat by florists.

Still another object of the present invention is to provide a fan-shaped support that secures the flower stems together.

FEATURES OF THE INVENTION

In keeping with the above objects and others which will become apparent hereinafter, one feature of the present invention resides, briefly stated, in a floral wrapper for wrapping at least one cut flower, and preferably a bouquet of cut flowers, the wrapper including a sheet having a leaf shape with curved edges, the sheet being curlable from a flat state to a conical state, and a tie for holding the sheet in the conical state around the flowers.

Each sheet is not a generally rectangular sheet cut from a supply roll, but instead is a pre-cut sheet having a shape made to resemble a natural leaf. For example, the edges of the leaf-shaped sheet are not linear, but are curved and may include many waves or undulations with rounded and/or jagged edges extending along a part, or the entire, of the periphery of the sheet. The leaf-shaped sheet bears colored graphics that may show branched leaf veins, as well as leaf colorations. An upper portion of the leaf-shaped sheet is preferably pointed, while middle and lower portions of the sheet are broader to resemble a leaf blade. The pre-cut leaf-shaped sheets stack flat to minimize inventory storage space and, when wrapped around a floral bouquet, creates the impression of a common floral theme. The wrapper is not a design eyesore to be quickly discarded, but instead, is an active design element in the overall floral presentation.

In the preferred embodiment, a pair of spaced-apart apertures extends through the sheet, and the tie passes through the apertures and overlies the flowers to capture the same between the tie and the sheet. Since the sheet is typically made of a thin, flexible, paper material, apertured reinforcements made of a stiffer material, such as plastic, are adhered in fixed positions at the apertures. The tie can be a string, a rope, a strap, a ribbon, or the like, and has end regions that are pulled taut and tied together around the sheet in the conical state and knotted exteriorly of the curled sheet. The reinforcements resist the tie from tearing the sheet, especially when the tie is pulled taut during formation of the knot.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is an exploded, perspective view of a floral wrapper during wrapping a bouquet of flowers;

FIG. 2 is a perspective view of the wrapper of FIG. 1 after the flowers have been captured by a tie on a leaf-shaped sheet;

FIG. 3 is a perspective, frontal view of the wrapped bouquet; and

FIG. 4 is an enlarged, sectional view taken on line 4—4 of FIG. 3.

DETAILED DESCRIPTION OF THE PREFERRED EMBODIMENTS

Referring to FIG. 1, reference numeral 10 identifies a thin, flexible sheet, preferably made of paper, but also made of other materials, such as plastic film, and configured with a leaf-shape. The leaf-shaped sheet 10 is shown in a flat state in FIGS. 1–2 and is curlable or rollable into a generally conical state as depicted in FIGS. 3–4.

As best seen in FIG. 1, the sheet 10 has a central axis 12, an upper, narrower, tapered part 14, and middle and lower broader blade parts 16. The periphery of the sheet 10 has a multitude of waves or undulations 18 which are jagged and/or rounded and successively arranged along a part of the periphery, or along the entire periphery. The undulations 18 are curved and have no linear, straight edges. The undulations may be regular and symmetrical or, as illustrated, irregular and asymmetrical relative to the axis 12. The sheet 10 bears graphics such as the illustrated branched veins 20 characteristic of a natural leaf, as well as colors, such as green, red and yellow which are likewise characteristic of the natural leaf at different seasons. Thus, the sheet 10 is configured and decorated to either realistically or artistically resemble the natural leaf, although it is oversized since, as explained below, it is employed to wrap at least one cut flower, and preferably a bouquet 22 of cut flowers, to form a fan-shaped floral presentation.

A pair of apertures 24, 26 extends through the sheet 10 and is spaced apart at opposite sides of the axis 12. A tie 28, preferably a rope, cord, string, ribbon, or like tether, is passed through the apertures and overlies, as best seen in FIG. 2, the stems of the cut flowers of the bouquet 22 placed on the sheet. The tie 28 is initially routed underneath the sheet and up through the aperture 24, and is then routed down through the aperture 26 and again underneath the sheet, thereby creating a span 30 for capturing the flower stems between the span 30 and the sheet. The routing of the tie through the apertures is preferably performed in advance by a florist so that it is merely necessary to insert the flower stems underneath the span 30 at the point of sale to begin the wrapping of the flowers.

FIG. 2 depicts the flowers after such insertion of the stems. The sheet 10 is laid flat on a countertop or like support surface, and the tie 28 has opposite ends 32, 34 extending underneath and past the blade parts 16. Thereupon, the blade parts 16 are curled over in a direction generally circumferentially of the axis 12 to assume the conical state of FIG. 3. The tie ends 32, 34 are pulled taut and tied together in a knot 36 located exteriorly of the curled sheet 10. FIG. 4 shows the tight capture of the flower stems between the span 30 and the sheet 10, as well as the tight binding of the tie around the curled sheet.

Since the sheet is typically made of thin paper, there is a tendency for the paper to tear when the tie is pulled taut during formation of the knot 36. To resist such tearing, a pair of apertured reinforcements 38, 40 is adhesively secured in place at the apertures 26, 24. The reinforcements 38, 40 are preferably made of a stiffer, tear-resistant material, such as plastic.

The wrapped bouquet of FIG. 3 creates a floral presentation having a common floral theme due to the leaf-shaped sheet whose presence is an integral design element in the presentation. A wide variety of leaf shapes is available. A customer of a florist may pick a desired shape. Both major surfaces of the sheet 10 bear the leaf simulation since at least part of both major surfaces are visible in the wrapped bouquet. The initial flat state of the sheet 10 makes it ideal to be shipped to and stacked flat at the florist.

It will be understood that each of the elements described above, or two or more together, also may find a useful application in other types of constructions differing from the types described above.

While the invention has been illustrated and described as embodied in a floral bouquet wrapper, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. A floral wrapper for wrapping at least one cut flower, comprising:
   a) a sheet having a leaf shape with curved edges, the sheet being curlable from a flat state to a conical state, the sheet having portions overlapping each other in the conical state; and
   b) a tie for holding the sheet in the conical state around the at least one cut flower.

2. The floral wrapper of claim 1, and further comprising a pair of apertures extending through the sheet and spaced apart from each other, and wherein the tie passes through the apertures and overlies the at least one cut flower to capture the same between the tie and the sheet.

3. The floral wrapper of claim 1, wherein the tie has end portions tied together outside the sheet.

4. The floral wrapper of claim 2, wherein the sheet is constituted of a paper material, and further comprising a pair of reinforcements at the apertures for maintaining the tie within the apertures.

5. The floral wrapper of claim 4, wherein each reinforcement is constituted of a material stiffer than the paper material.

6. The floral wrapper of claim 5, wherein each reinforcement is an apertured plastic piece adhered in a fixed position at a respective aperture.

7. The floral wrapper of claim 1, wherein the tie is one of a string, a rope, a strap, and a ribbon.

8. The floral wrapper of claim 1, wherein the tie is operative for holding the sheet in the conical state around a plurality of cut flowers.

9. The floral wrapper of claim 2, wherein the sheet has a central axis, and wherein the apertures are located at opposite sides of the axis.

10. The floral wrapper of claim 1, wherein the curved edges of the leaf shape of the sheet are successively arranged entirely around a periphery of the sheet.

11. The floral wrapper of claim 1, wherein the curved edges include rounded and jagged edges.

12. The floral wrapper of claim 1, wherein the sheet bears indicia resembling a natural leaf.

13. The floral wrapper of claim 12, wherein the indicia includes branched veins.

14. The floral wrapper of claim 12, wherein the indicia includes colored graphics.

15. The floral wrapper of claim 1, wherein the leaf shape of the sheet includes an upper tapered part and a lower broader part.

16. A floral wrapper for wrapping a plurality of cut flowers, comprising:
   a) a sheet having a leaf shape and curlable from a flat state to a conical state, the sheet having portions overlapping each other in the conical state, the sheet having apertures extending through the sheet and spaced apart from each other; and
   b) a tie passing through the apertures and overlying the cut flowers to capture the same between the tie and the sheet, the tie having end regions tied together to hold the wrapper in the conical state around the cut flowers.

17. The floral wrapper of claim 16, and further comprising apertured reinforcements at the apertures.

18. The floral wrapper of claim 16, wherein the sheet has a periphery and includes a plurality of undulating, curved edges arranged along the periphery.

19. The floral wrapper of claim 16, wherein the sheet bears indicia and graphics resembling a natural leaf.

20. The floral wrapper of claim 19, wherein the indicia and graphics are located on both major surfaces of the sheet.

* * * * *